Feb. 24, 1970

A. P. GABRIEL 3,496,791

ANTI-BACKLASH GENEVA MECHANISM

Filed Sept. 16, 1968

ALFRED P. GABRIEL
INVENTOR.

BY *James C. Simmons*
ATTORNEY

United States Patent Office 3,496,791
Patented Feb. 24, 1970

3,496,791
ANTI-BACKLASH GENEVA MECHANISM
Alfred P. Gabriel, Greece, N.Y., assignor to Bausch & Lomb Incorporated, Rochester, N.Y., a corporation of New York
Filed Sept. 16, 1968, Ser. No. 759,942
Int. Cl. F16h 27/04, 55/04, 55/14
U.S. Cl. 74—409                       6 Claims

ABSTRACT OF THE DISCLOSURE

An intermittent rotation mechanism of the Geneva type wherein there is provided means for preventing reverse movement of the driven wheel between successive advancements. The mechanism is further characterized in that the engaging surfaces of the drive wheel and the driven wheel are so shaped during contact to provide smooth transfer of the rotating motion.

BACKGROUND OF THE INVENTION

Intermittent rotation mechanisms of the Geneva type are well known. They find wide application in such diverse fields as optical projecting devices and Teletype machines. In addition, the Geneva mechanism is applicable to the ophthalmic industry, and in particular finds use in the well-known Greens' refractor. The Greens' refractor is used for testing vision and for determining the necessary correction to be put on spectacles prepared for the patient under examination. The Geneva mechanism comes into play in that portion of the instrument wherein various corrective lenses may be put between the patient's eye and the viewing screen in order to determine the correction. The correction is measured in fractions of diopters and when the fraction is a whole then a new lens is placed in front of the patient's eye. Therefore, the Geneva mechanism can be used to first rotate the fractional lenses and then the complete diopter lens.

Prior art Geneva mechanisms are characterized in that the intermittent advancement of the driven wheel is not accomplished with a smooth translation of motion because of the configuration of the mating surfaces of the actuator on the drive wheel and the actuator engaging surfaces on the driven wheel. In addition, the driven wheel is supposed to maintain a fixed position after the intermittent advancement. However, in prior art devices there is some reverse motion or backlash after each advancement necessitating some further adjustment or external holding device. Most prior art Geneva mechanisms have a generally square or rectangular shaped lug on the drive wheel which engages a mating square or rectangular shaped projection or series of projections on the driven wheel to provide the intermittent rotation.

SUMMARY OF THE INVENTION

In order to overcome the above-described problems and to more generally, provide an improved Geneva mechanism I have discovered that by fabricating the lug engaging portions of the driven wheel so as to engage and exert a force on the drive wheel between each successive advancement, the backlash can be totally eliminated from a Geneva mechanism. In addition, by providing the lug surfaces that engage the driven wheel and the surfaces on the driven wheel that engage the lug with involute shaped curves during engagement, a smooth transfer of rotating motion from the drive wheel to the driven wheel is accomplished.

Therefore, it is a primary object of the present invention to provide an anti-backlash Geneva mechanism.

It is another object of the present invention to provide an intermittent rotation mechanism which provides smooth transfer of the rotating motion from the drive wheel to the driven wheel.

It is still another object of the present invention to provide an intermittent rotation mechanism with involute shaped mating surfaces during the motion transfer period.

DETAILED DESCRIPTION OF THE PREFERRED EMBODIMENT

Figure 1:
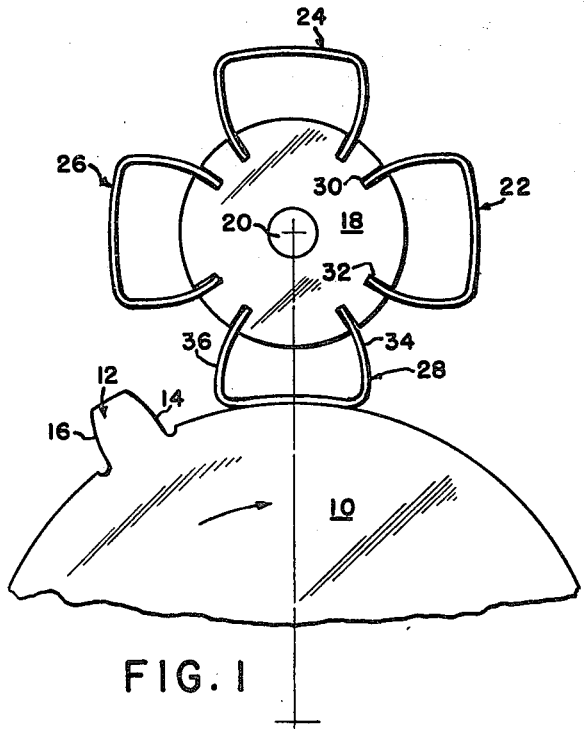
FIGURE 1 is a schematic diagram of the device according to the present invention shown during that period of the cycle wherein the driven wheel remains motionless.

Referring now to FIGURE 1, there is shown the portion of a drive wheel 10 wherein there is provided an actuator 12. The actuator is in the shape of a gear tooth with involute surfaces 14 and 16 as are well known in the art of manufacturing gears. The driven wheel is shown as 18 mounted on a shaft 20. Disposed about the periphery of the driven wheel 18 are a plurality of actuator engaging members 22, 24, 26 and 28. The actuator engaging members 22, 24, 26 and 28 are manufactured from a resiliently deformable material such as spring steel. The actuator engaging members 22, 24, 26 and 28 are shown in FIGURE 1 as disposed in slots such as 30, 32 shown in connection with actuator engaging member 22. The slots are made to receive and hold the resiliently deformable material. The slots 30, 32 and the actuator receiving members such as 22 are so disposed on the driven wheel so that when the actuator engaging member is in contact with the drive wheel 10 the bottom surface is deformed and held in frictional engagement with the drive wheel 10. This is better illustrated in connection with actuator engaging member 28 shown in FIGURE 1. The actuator engaging members such as 28 are so constructed that when in contact with the drive wheel the actuator surfaces 34, 36 are disposed into an involute shaped curve to match the curves on the actuator lug 12. This is accomplished by the proper adjustment of the slots holding the actuator engaging members and the fact that the bottom of the actuator engaging member is urged toward the driven wheel 18.

Figure 2:
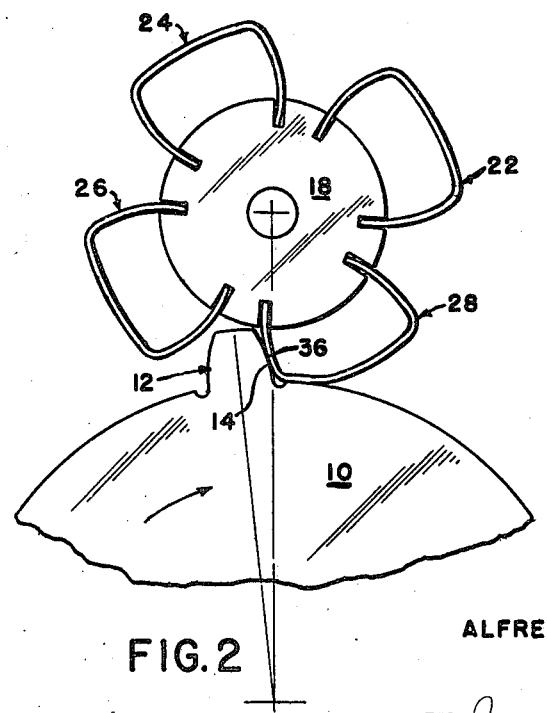
FIGURE 2 is a schematic diagram of the device according to the present invention shown during that portion of the cycle wherein motion is imparted to the driven wheel.

As shown in FIGURE 2, when the lug 12 on wheel 10 engages the actuator 28 disposed on wheel 18 the mating surfaces 14 and 36 engage one another as do normal involute shaped gear teeth. Further, as the cycle is completed, actuator engaging member 26 will engage wheel 10 on the outer periphery of the wheel in frictional engagement until the next revolution of the lug thereby preventing reverse movement of the driven wheel.

The actuator engaging members 22, 24, 26 and 28 can be manufactured from any resiliently deformable materials such as plastic or metals. The number of actuator engaging members will be determined by the size of the drive wheel and the distance travelled by the driven wheel per revolution of the drive wheel. Therefore, any combination of sizes may produce different numbers as to actuator engaging members.

The method of mounting the actuator engaging members can be changed to accommodate the material. For example, the actuator engaging members can be bolted or welded to the driven wheel or made as an integral part thereof by a molding technique.

I claim:
1. In an intermittent rotation mechanism of the type comprising a drive wheel, a driven wheel and an actuator on the drive wheel to intermittently engage and advance the driven wheel, the improvement which comprises:

resiliently deformable actuator engaging members attached to said driven wheel, to engage said actuator and prevent reverse movement of said driven wheel after engagement with said actuator.

2. An intermittent rotation mechanism of the Geneva type comprising:
   a drive wheel with a lug to engage a driven wheel;
   said driven wheel having resiliently deformable lug engaging members for frictionally engaging the periphery of the drive wheel to prevent reverse movement of the driven wheel.

3. An intermittent rotation mechanism according to claim 2 wherein the lug is provided with involute curved surfaces for engaging the driven wheel lug engaging members.

4. An intermittent rotation mechanism according to claim 2 wherein the resiliently deformable lug engaging members form involute lug engaging surfaces when engaged with the periphery of the drive wheel.

5. An intermittent rotation mechanism of the Geneva type comprising:
   resiliently deformable actuator engaging members on the driven wheel so constructed and arranged to frictionally engage the drive wheel between successive advancements by the drive wheel so as to prevent reverse motion by the drive wheel.

6. An intermittent rotation mechanism according to claim 5 wherein the actuator has involute curved lug engaging surfaces to provide smooth transfer of rotating motion from the drive wheel to the driven wheel.

References Cited

UNITED STATES PATENTS

| | | | |
|---|---|---|---|
| 2,572,334 | 10/1951 | Guibert | 74—461 |
| 3,213,704 | 10/1965 | McDougal | 74—449 |
| 3,446,089 | 5/1969 | Stockton | 74—448 |

LEONARD H. GERIN, Primary Examiner

U.S. Cl. X.R.

74—84, 411, 436, 448, 449, 461